United States Patent
Sun et al.

(10) Patent No.: US 8,902,809 B2
(45) Date of Patent: **\*Dec. 2, 2014**

(54) METHOD AND APPARATUS FOR HANDLING DATA SENDING AND RECEIVING

(75) Inventors: Weijun Sun, Kista (SE); Bingyu Qu, Rolling Meadows, IL (US); Yang Li, Beijing (CN); Lei Wan, Beijing (CN); Qiang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 419 days.

This patent is subject to a terminal disclaimer.

(21) Appl. No.: 13/283,771

(22) Filed: Oct. 28, 2011

(65) Prior Publication Data

US 2012/0039297 A1   Feb. 16, 2012

Related U.S. Application Data

(63) Continuation of application No. PCT/CN2009/071537, filed on Apr. 28, 2009.

(51) Int. Cl.
| | | |
|---|---|---|
| H04B 7/204 | (2006.01) | |
| H04W 4/00 | (2009.01) | |
| H04J 1/00 | (2006.01) | |
| H04L 5/00 | (2006.01) | |
| H04L 25/02 | (2006.01) | |

(52) U.S. Cl.
CPC ............ *H04L 5/0023* (2013.01); *H04L 5/0048* (2013.01); *H04L 25/0204* (2013.01); *H04L 25/0226* (2013.01)
USPC ............ 370/319; 370/330; 370/343; 370/436

(58) Field of Classification Search
CPC ..... H04W 72/04; H04W 88/08; H04W 76/00; H04L 5/0023; H04L 5/005; H04L 5/00051; H04L 5/0048; H04L 5/0094; H04L 25/0204; H04L 25/0208; H04L 25/0226; H04L 27/26; H04L 27/2613; H04L 27/3455

USPC ......... 370/310–350, 427–429, 431, 436–437, 370/441–442, 478–480, 203–210, 329–330, 370/342–345, 464; 375/219, 260, 267, 295, 375/299, 347–349; 455/450–452.2, 464, 455/501, 509

See application file for complete search history.

(56) References Cited

U.S. PATENT DOCUMENTS

| | | | |
|---|---|---|---|
| 7,298,805 B2 * | 11/2007 | Walton et al. | ......... 375/347 |
| RE40,254 E | 4/2008 | Nikula et al. | |

(Continued)

FOREIGN PATENT DOCUMENTS

| | | |
|---|---|---|
| CN | 1464667 | 12/2003 |
| CN | 1534897 | 10/2004 |

(Continued)

OTHER PUBLICATIONS

International Search Report mailed Jul. 29, 2010 issued in corresponding International Patent Application No. PCT/CN2010/072030.

(Continued)

*Primary Examiner* — Tri H Phan
(74) *Attorney, Agent, or Firm* — Staas & Halsey LLP

(57) ABSTRACT

A method and an apparatus for handling data sending and receiving are disclosed by the present invention, where the method for handling data sending includes: allocating the number of space transmission layers and pilot frequency resource for transmission at each transmission layer (101); generating pilot frequency resource information according to the number of space transmission layers and the pilot frequency resource for transmission at each transmission layer (102); and sending the pilot frequency resource information to a UE (103). The embodiments of the present invention can enable the UE to determine the specifically used pilot frequency resources to effectively distinguish the specific user channels, obtain correct channel estimation values, improve the channel estimation performance, and obtain correct service data.

20 Claims, 8 Drawing Sheets

(56) References Cited

U.S. PATENT DOCUMENTS

| | | | |
|---|---|---|---|
| 7,826,489 B2 | 11/2010 | Buidanu et al. | |
| 7,889,758 B2* | 2/2011 | Li et al. | 370/464 |
| 8,165,018 B2* | 4/2012 | Jia et al. | 370/229 |
| 8,243,678 B2* | 8/2012 | Cudak et al. | 370/330 |
| 8,320,301 B2* | 11/2012 | Walton et al. | 370/328 |
| 8,363,633 B2* | 1/2013 | Ko et al. | 370/343 |
| 8,488,694 B2* | 7/2013 | Wu et al. | 375/260 |
| 8,593,976 B2* | 11/2013 | Kishigami et al. | 370/252 |
| 8,619,620 B2* | 12/2013 | Medvedev et al. | 370/253 |
| 8,665,811 B2* | 3/2014 | Nory et al. | 370/329 |
| 2005/0180449 A1 | 8/2005 | Ranta-Aho et al. | |
| 2007/0147536 A1* | 6/2007 | Melzer et al. | 375/267 |
| 2008/0212701 A1 | 9/2008 | Pan et al. | |
| 2008/0212702 A1 | 9/2008 | Pan et al. | |
| 2008/0285488 A1* | 11/2008 | Walton et al. | 370/280 |
| 2009/0215399 A1* | 8/2009 | Majonen | 455/67.11 |
| 2010/0085866 A1* | 4/2010 | Li et al. | 370/208 |
| 2010/0272032 A1* | 10/2010 | Sayana et al. | 370/329 |
| 2011/0019605 A1 | 1/2011 | Ma et al. | |
| 2012/0044902 A1* | 2/2012 | Sun et al. | 370/329 |
| 2012/0269295 A9* | 10/2012 | Ko et al. | 375/299 |
| 2013/0044727 A1 | 2/2013 | Nory et al. | |

FOREIGN PATENT DOCUMENTS

| | | |
|---|---|---|
| CN | 1842176 | 10/2006 |
| CN | 1889554 | 1/2007 |
| CN | 101227249 | 7/2008 |
| CN | 101242214 A | 8/2008 |
| CN | 101370240 | 2/2009 |
| CN | 101370240 A | 2/2009 |
| WO | 2007/098456 | 8/2007 |
| WO | 2007/098456 A2 | 8/2007 |
| WO | 2008/061045 | 5/2008 |
| WO | 2008/103317 | 8/2008 |
| WO | 2009/026768 A1 | 3/2009 |
| WO | 2010/124456 | 4/2009 |

OTHER PUBLICATIONS

Written Opinion of the International Searching Authority mailed Jul. 29, 2010 issued in corresponding International Patent Application No. PCT/CN2010/072030.

Freescale Semiconductor Inc., "Reference signalling for MU-MIMO", 3GPP TSG RAN WG1 #49, May 2007, pp. 1-4.

Nokia Siemens Networks, "LTE Multiuser MIMO and Interference Suppression in the UE", TSG RAN WG1 Meeting #49, Jun. 2007, pp. 1-3.

Qualcomm Europe, "Overview of DL Spatial Multiplexing Schemes for E-UTRA", 3GPP TSG-RAN WG1 #44, Feb. 2005, pp. 1-5.

Philips, "Performance of LTE DL MU-MIMO with dedicated pilots", 3GPP TSG RAN WG1, Meeting #48, Mar. 2007, pp. 1-5.

Extended European Search Report dated Mar. 19, 2012 issued in corresponding European Patent Application No. 09843868.2.

First Chinese Office Action issued Jul. 13, 2012 in corresponding Chinese Patent Application No. 200980124741.8.

International Search Report for PCT/CN2009/071537, mailed Feb. 4, 2010.

Extended European Search Report dated Jun. 6, 2012 issued in corresponding European Patent Application No. 10769270.9.

Research in Motion et al., "Further Discussion on Signaling of DM-RS Port for LTE-A MIMO Transmission", 3GPP TSG RAN WG1 Meeting #59, Nov. 2009, pp. 1-6.

Nokia et al., "UE-specific reference symbol multiplexing for LTE-Advanced downlink", 3GPP TSG RAN WG1 Meeting #56, Mar. 2009, pp. 1-8.

Motorola, "Control Signaling for Enhanced DL Transmission for LTE Discussion and Decision", 3GPP TSG RAN WG1 #56, Mar. 2009, pp. 1-10.

Alcatel-Lucent et al., "Support Multi-layer Beamforming in LTE", 3GPP TSG RAN WG1 #56, Mar. 2009, pp. 1-3.

Yong Sun et al., "Proposed Text of MIMO for the IEEE 802.16m Amendment", IEEE 802.16 Broadband Wireless Access Working Group, Mar. 2009, pp. 1-36.

*Control signaling aspects of MU-MIMO*, 3GPP TSG RAN WG1 Meeting #50, Athens, Greece, Aug. 25-29, 2007.

Chinese Office Action mailed Feb. 25, 2013 for corresponding Chinese Application No. 200980124741.8.

Written Opinion of International Searching Authority dated Feb. 4, 2010, Issued in Application No. PCT/CN2009/071537.

Office Action issued on Feb. 28, 2014 in copending U.S. Appl. No. 13/282,971.

Final Office Action issued on Jun. 12, 2014 in copending U.S. Appl. No. 13/282,971.

Notice of Allowance issued in copending U.S. Appl. No. 13/282,971 on Sep. 29, 2014.

* cited by examiner

METHOD AND APPARATUS FOR HANDLING DATA SENDING AND RECEIVING

CROSS-REFERENCE TO RELATED APPLICATIONS

This application is a continuation of International Application No. PCT/CN2009/071537, filed on Apr. 28, 2009, which is hereby incorporated by reference in its entirety.

FIELD OF THE INVENTION

The present invention relates to a communication technology, and in particular, to a method and an apparatus for handling data sending and receiving.

BACKGROUND

As regulated in the Long Term Evolve (LTE) protocol, public pilot frequency symbols can be used to obtain the channel estimation value required for demodulating data. When public pilot frequency symbols can be used to obtain the channel estimation value required for demodulating data, an eNodeB determines a precoding matrix of a user equipment (UE), and notifies the UE of the precoding matrix index (PMI) corresponding to the precoding matrix. According to the public pilot frequency and PMI, the UE obtains the channel estimation value required for demodulating data. In Multiple User Multiple Input Multiple Output (MU-MIMO) working mode, the eNodeB needs to notify the UE of a power offset. The UE can learn, according to the power offset, whether matching UEs exist, and then obtains, according to the public pilot frequency, PMI and power offset, the channel estimation value required for demodulating MU-MIMO data.

In the LTE+ technology, dedicated pilot frequency symbols are used to obtain the channel estimation value required for demodulating data. In a dedicated pilot frequency channel, pilot frequency signals are combined with data signals in time division or frequency division multiplexing mode for transmission. During data transmission, the eNodeB notifies the UE of the number of transmission layers used in data transmission. At the receiving end, after receiving the receive signal, the UE obtains, according to the number of transmission layers and pilot frequency resources that are used for transmitting pilot frequency symbols and are corresponding to each transmission layer, the channel estimation value required for demodulating data, and demodulates the data according to the channel estimation value to obtain service data. The code of the pilot frequency resources corresponding to each transmission layer can be preset by the UE as notified by the eNodeB or preset with the UE.

During implementation of the present invention, the inventor finds at least the following problems in the existing technology of using dedicated pilot frequency symbols in data demodulation:

The eNodeB notifies the UE of only the number of transmission layers used for data transmission. In MU-MIMO transmission mode, multiple UEs transmit data through different transmission layers. A UE cannot determine the specific pilot frequency resources based only on the number of transmission layers used for data transmission. Therefore, multiple UEs may use the same pilot frequency resources. The specific UE channels cannot be distinguished. In this case, no accurate channel estimation values can be obtained. As a result, the channel estimation performance is lowered, and the correct service data cannot be obtained.

SUMMARY

The technical issue to be addressed by embodiments of the present invention is to provide a method and an apparatus for handling data sending and receiving so that a UE can distinguish specific user channels to obtain a correct channel estimation value, thereby efficiently guaranteeing the channel estimation performance and obtaining the correct service data.

A method for handling data sending is provided in an embodiment of the present invention. The method includes:
allocating the number of space transmission layers and pilot frequency resource for transmission at each transmission layer;
generating pilot frequency resource information according to the number of space transmission layers and the pilot frequency resource for transmission at each transmission layer; and
sending the pilot frequency resource information to a user equipment (UE).

A method for handling data receiving is provided in an embodiment of the present invention. The method includes:
receiving pilot frequency resource information;
determining pilot frequency resource according to the pilot frequency resource information;
obtaining a channel estimation value of a channel used by a UE, according to the received data information and pilot frequency resource; and
obtaining service data according to the data information and the channel estimation value.

An apparatus for handling data sending is provided in an embodiment of the present invention. The apparatus includes:
an allocating module, configured to allocate the number of space transmission layers and pilot frequency resource for transmission at each transmission layer;
a generating module, configured to generate pilot frequency resource information according to the number of space transmission layers and the pilot frequency resource for transmission at each transmission layer; and
a sending module, configured to send the pilot frequency resource information to a UE.

An apparatus for handling data receiving is provided in an embodiment of the present invention. The apparatus includes:
a receiving module, configured to receive data information and pilot frequency resource information;
a pilot frequency resource obtaining module, configured to determine pilot frequency resource according to the pilot frequency resource information;
a first obtaining module, configured to obtain a channel estimation value of a channel used by a UE, according to the received data information and pilot frequency resource; and
a second obtaining module, configured to obtain service data according to the data information and the channel estimation value.

A communication system is provided in an embodiment of the present invention. The system includes an eNodeB and a UE. The eNodeB is configured to allocate the number of space transmission layers and pilot frequency resource for transmission at each transmission layer, generate pilot frequency resource information according to the number of space transmission layers and the pilot frequency resource for transmission at each transmission layer, and send the pilot frequency resource information to the UE.

The UE is configured to receive data information and pilot frequency resource information; determine pilot frequency resource according to the pilot frequency resource information; obtain a channel estimation value of a channel used by a UE, according to the received data information and pilot frequency resource; and obtain service data according to the data information and the channel estimation value.

Based on the method and apparatus for handling data sending and receiving provided in the preceding embodiments, pilot frequency resource information can be generated according to the number of space transmission layers and pilot frequency resource for transmission by each space transmission layers allocated to each UE, and the pilot frequency resource information can be sent to the UE; according to the pilot frequency resource information, the UE can determine the specifically used pilot frequency resources to effectively distinguish the specific user channels, obtain the correct channel estimation value, improve the channel estimation performance, and obtain correct service data.

The technical solutions provided in embodiments of the present invention are described as follows with accompanying drawings and embodiments:

DETAILED DESCRIPTION

Figure 1:
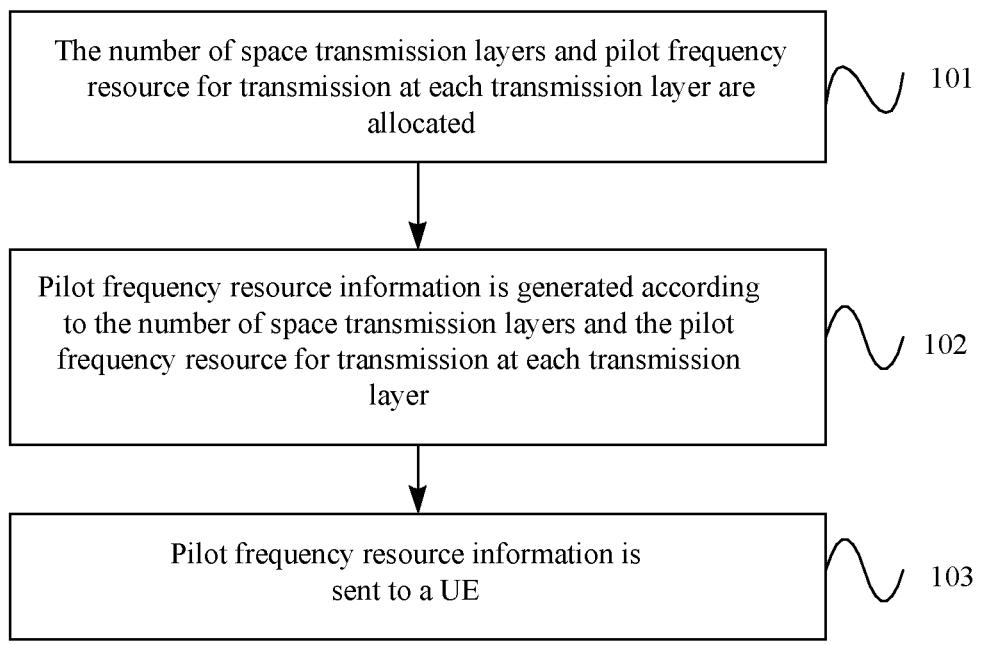
FIG. 1 is a flowchart of a method for handling data sending provided in an embodiment of the present invention.

FIG. 1 is a flowchart of a method for handling data sending provided in an embodiment of the present invention. The embodiment can be implemented by an eNodeB. As shown in FIG. 1, the embodiment includes the following steps:

Step 101: allocating the number of space transmission layers and pilot frequency resource for transmission at each transmission layer.

Step 102: generating pilot frequency resource information according to the number of space transmission layers and the pilot frequency resource for transmission at each transmission layer.

Specifically, according to an embodiment of the present invention, the pilot frequency resource information includes: pilot frequency resource for transmission at a first space transmission layer among the allocated space transmission layers, and the number of space transmission layers. Or, according to another embodiment of the present invention, the pilot frequency resource information includes allocated pilot frequency resource for transmission at each space transmission layer. Or, according to another embodiment of the present invention, the pilot frequency resource information includes pilot frequency resource for transmission at a first space transmission layer among the allocated space transmission layers. In addition, the pilot frequency resource information in the embodiment of the present invention is not limited to the preceding, as long as the UE can determine, according to the pilot frequency resource information, the pilot frequency resource used by the UE.

Step 103: sending the pilot frequency resource information to a UE.

According to an embodiment of the present invention, the pilot frequency resource information can be carried in data information for sending to the UE.

In addition, according to another embodiment of the present invention, compared with the embodiment as shown in FIG. 1, the pilot frequency resource information may further include the current usage status of pilot frequency resources in the communication system. The current usage status of pilot frequency resources specifies the number of resource units currently used in the communication system. According to the total number of parts of pilot frequency resources in the communication system and the number of resource units included in each part of pilot frequency resource, the UE can obtain possible pilot frequency resource information of a matching UE, where the matching UE indicates the UE that uses the same time frequency resources. According to the pilot frequency resource information of the matching UE, the channel estimation value of the matching UE can be estimated, so as to perform signal detection or interference suppression detection, thereby improving the signal detection performance, correctly obtaining resource units of transmission service data, and correctly obtaining service data from the resource units of the transmission service data.

In addition, according to another embodiment of the present invention, compared with the embodiment as shown in FIG. 1, the pilot frequency resource information may include the usage status of the pilot frequency resource for transmission at each allocated space transmission layer. For example, for the code division multiplexing mode, the usage status of the pilot frequency resource may be the code of the pilot frequency resource so that the UE can obtain, according to the code and received data information, the channel estimation value of the channel used by the UE, and further obtain service data according to the channel estimation value.

In the method for handling data sending provided in the preceding embodiment, step 101 is specifically: allocating to at least one UE the number of space transmission layers and pilot frequency resource for transmission at each space transmission layer.

Figure 2:
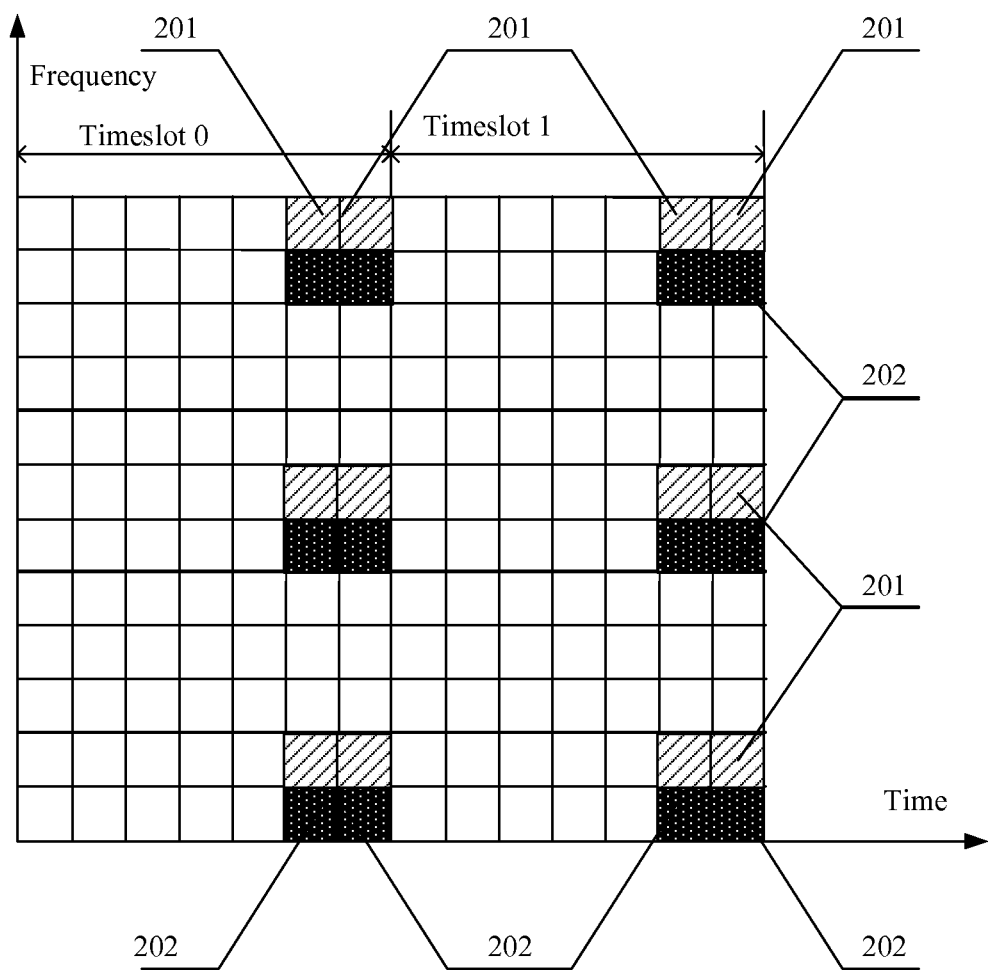
FIG. 2 is a schematic diagram of a time frequency resource block.

FIG. 2 is a schematic diagram of a time frequency resource block. In the following example, the time frequency resources in the communication system are time frequency resource blocks as shown in FIG. 2. The method for handling data sending provided in the embodiment of the present invention is described as follows. In FIG. 2, a sub frame includes two timeslots: timeslot 0 and timeslot 1. Each timeslot includes seven orthogonal frequency division multiplexing (OFDM) symbols, including 12×7 resource elements (REs). In the resource block as shown in FIG. 2, the following method can be used to allocate pilot frequency resource: for a first RE 201, code division multiple (CDM) is introduced to the time domain to provide four orthogonal pilot frequency resources. For example, the 4×4 Walsh matrix is formed of c1, c2, c3, and c4, where c1=[1,1,1,1], c2=[1,−1,1,−1], c3=[1,1,−1,−1], and c4=[1,−1,−1,1]. The same method is applied in a second RE 202, CDM is introduced in the time domain to provide four orthogonal pilot frequency resources. In this embodiment, the usage status of pilot frequency resources that are allocated to the UE and are transmitted at the space transmission layers is to allocate the code of the pilot frequency resources to the UE. The code can be c1=[1,0,1,0], c2=[0,1,0,1], c3=[1,0,−1,0], and c4=[0,1,0,−1].

In space multiplexing transmission, the communication system arranges the dedicated pilot frequency resources that support space multiplexing transmission as shown in FIG. 2. Suppose that: in the first RE 201, p1, p2, p5 and p6 are used to identify the pilot frequency resources at a first, second, fifth, and sixth space multiplexing transmission layers. The codes are c1, c2, c3, and c4, which can be c1=[1,1,1,1], c2=[1,−1,1,−1], c3=[1,1,−1,−1], and c4=[1,−1,−1,1], or c1=[1,0,1,0], c2=[0,1,0,1], c3=[1,0,−1,0], and c4=[0,1,0,−1]. In the second RE 202, p3, p4, p7, and p8 are used to identify the pilot frequency resources at a third, fourth, seventh, and eight space multiplexing transmission layers. The codes are c1, c2, c3, and c4, which can be c1=[1,1,1,1], c2=[1,−1,1,−1], c3=[1,1,−1,−1], and c4=[1,−1,−1,1], or c1=[1,0,1,0], c2=[0,1,0,1], c3=[1,0,−1,0], and c4=[0,1,0,−1].

According to the 3$^{rd}$ Generation Partner Project (3GPP) technology, in Single user MIMO (SU-MIMO) mode, the preceding arrangement sequence of pilot frequency resources is used. If the number of space multiplexing layers is equal to or smaller than 4, the pilot frequency resources corresponding to p1 to p4 are selected in sequence according to the number of space multiplexing layers to provide a high transmission throughput. In MU-MIMO mode, however, the matching UEs have a certain space isolation degree. The transmitted signals have different directions in space.

Suppose that a first UE and a second UE are matching UEs. The eNodeB allocates to the first UE one space transmission layer and pilot frequency resource for transmission at the space transmission layer. That is, the number of space transmission layers is 1, and the pilot frequency resource for transmission at the space transmission layer is p1. The eNodeB allocates to the second UE two space transmission layers and allocates to the second UE pilot frequency resource for transmission at each space transmission layer of the two allocated space transmission layers. That is, the number of space transmission layers is 2, and the pilot frequency resource for transmission at a first space transmission layer is p3. The communication system currently uses 24 REs. The eNodeB generates pilot frequency resource information according to the number of space transmission layers and pilot frequency resource for transmission at each space transmission layer allocated to the first UE and the current usage status of the pilot frequency resources in the communication system, and sends the pilot frequency resource information carried in data information to the first UE. The eNodeB generates pilot frequency resource information according to the number of space transmission layers and pilot frequency resource for transmission at each space transmission layer allocated to the second UE and the current usage status of the pilot frequency resources in the communication system, and sends the pilot frequency resource information carried in data information to the second UE.

After obtaining pilot frequency resource information from the data information, the first UE learns that the number of space transmission layers allocated to itself is 1, that the pilot frequency resource for transmission at the first space multiplexing transmission layer is p1, and therefore learns that its own pilot frequency resource is p1. Further, the communication system currently uses 24 REs, that is, uses up the first RE 201 and second RE 202, it can be learned that the data transmission resource unit is an RE other than the first RE 201 and second RE 202 as shown in FIG. 2. Therefore, the first UE can correctly obtain from the data transmission resource unit the service data sent by the eNodeB.

Similarly, after obtaining the pilot frequency resource information from the data information, the second UE learns that the number of space transmission layers allocated to itself is 2, that the pilot frequency resource for transmission at the first space multiplexing transmission layer is p3, and therefore learns that its own pilot frequency resources are p3 and p4. Further, the communication system currently uses 24 REs, that is, uses up the first RE 201 and second RE 202, it can be learned that the data transmission resource unit is an RE other than the first RE 201 and second RE 202 as shown in FIG. 2. Therefore, the second UE can correctly obtain from the data transmission resource unit the service data sent by the eNodeB.

In MU-MIMO mode, the communication system can use only the same RE, for example, only the first RE 201 or second RE 202, or can also use both REs. Therefore, in MU-MIMO working mode, the eNodeB and UE may agree on the current usage status of pilot frequency resources or the eNodeB may notify the UE of the current usage status of pilot frequency resources. Multiple matching UEs have a certain space isolation degree. Therefore, when the number of matching UEs is equal to or smaller than 4, the maximum number of transmission layers of each UE is equal to or smaller than 2, and the total number of transmission layers of multiple matching UEs is equal to or smaller than 4, the communication system may consider which type of the RE can be only used by the multiple matching UEs. In this way, when notifying the UEs of the current usage status of pilot frequency resources, the eNodeB does not need to send the types of REs in use, thereby reducing the information transmission volume, and simplifying processing of UEs on the information.

For example, if the eNodeB and UE agrees on the first RE 201 in advance, in the preceding embodiment, the current usage status of pilot frequency resources in the communication system does not need to be carried in the pilot frequency resource information. The number of space transmission layers allocated by the eNodeB to the first UE 1 is 1, and the pilot frequency resource for transmission at the first space multiplexing transmission layer is p1. The number of space transmission layers allocated by the eNodeB to the second UE 2 is 2, and the pilot frequency resource for transmission at the first space multiplexing transmission layer is p2. The eNodeB generates pilot frequency resource information according to the number of space transmission layers and pilot frequency resource for transmission at each space transmission layer allocated to the first UE, and sends the pilot frequency resource information carried in the data information to the first UE. The eNodeB generates pilot frequency resource information according to the number of space transmission layers and pilot frequency resource for transmission at each space transmission layer allocated to the second UE, and sends the pilot frequency resource information carried in the data information to the second UE. After obtaining the pilot frequency resource information from the data information, the first UE learns that the number of space transmission layers allocated to itself is 1, that the pilot frequency resource for transmission at the first space multiplexing transmission layer is p1, and therefore learns that its own pilot frequency resource is p1. After obtaining the pilot frequency resource information from the data information, the second UE learns that the number of space transmission layers allocated to itself is 2, that the pilot frequency resource for transmission at the first space multiplexing transmission layer is p2, and therefore learns that its own pilot frequency resources are p2 and p5. Further, the communication system agrees on using the first RE 201 in advance, it can be learned that the data transmission resource unit is an RE other than the first RE 201 as shown in FIG. 2. Therefore, the first and second UEs can correctly obtain respectively from the data transmission resource unit the service data sent by the eNodeB.

In addition, according to the embodiment of the present invention, the UE can obtain the pilot frequency resource information of other matching UEs through the current usage status of the pilot frequency resources in the communication system, for example, by agreeing on the RE or REs used by the matching UEs. For example, if the eNodeB and UE agrees on using the first RE 201 in advance, in the preceding embodiment, the first UE learns that its own pilot frequency resource is p1, and infers that the pilot frequency resources used by the second UE may be p2, p5, and p6. In this way, the first UE can estimate the channel estimation value of the second UE by detecting pilot frequency resources p2, p5, and p6, and perform signal detection or interface suppression detection according to the channel estimation value of the second UE. The second UE learns that its own pilot frequency resources are p2 and p5, and infers that the pilot frequency resources used by the first UE may be p1 and p6. In this way, the second UE can estimate the channel estimation value of the first UE by detecting pilot frequency resources p1 and p6, and perform signal detection or interface suppression detection according to the channel estimation value of the first UE.

Figure 3:
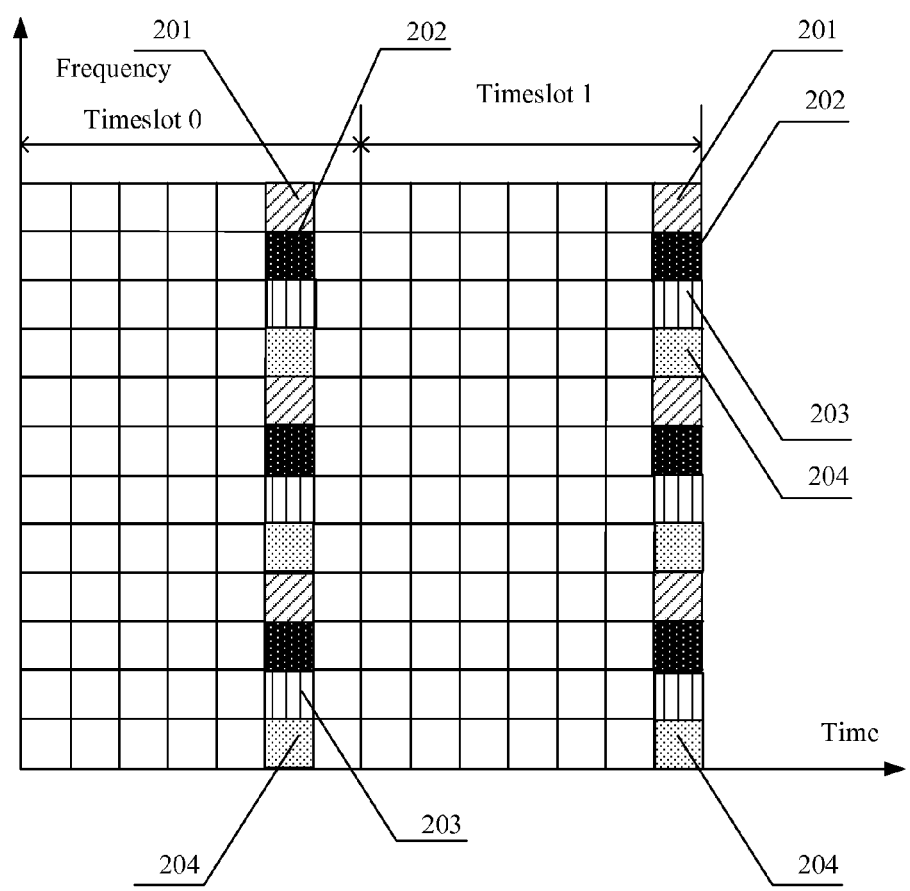
FIG. 3 is a schematic diagram of another time frequency resource block.

FIG. 3 is a schematic diagram of another time frequency resource block. Compared with the time frequency resource block in FIG. 2, in the time frequency resource block shown in FIG. 3, a first RE 201, second RE 202, third RE 203, and fourth RE 204 respectively correspond to pilot frequency resources at a first, second, third, and fourth space multiplexing transmission layers, which are marked by p1, p2, p3, and p4.

Suppose that a first UE and second UE are matching UEs. The eNodeB allocates to the first UE one space transmission layer and pilot frequency resource for transmission at the space transmission layer. That is, the number of space transmission layers is 1, and the pilot frequency resource for transmission at the space transmission layer is p1. The eNodeB allocates to the second UE two space transmission layers and allocates to the second UE pilot frequency resource for transmission at each space transmission layer of the two allocated space transmission layers. That is, the number of space transmission layers is 2, and the pilot frequency resource for transmission at the first space transmission layer is p2. The pilot frequency resources currently used by the communication system are p1, p2, and p3. The eNodeB generates pilot frequency resource information according to the number of space transmission layers and pilot frequency resource for transmission at each space transmission layer allocated to the first UE and the current usage status of the pilot frequency resources in the communication system, and sends the pilot frequency resource information carried in data information to the first UE. The eNodeB generates pilot frequency resource information according to the number of space transmission layers and pilot frequency resource for transmission at each space transmission layer allocated to the second UE and the current usage status of the pilot frequency resources in the communication system, and sends the pilot frequency resource information carried in data information to the second UE.

After the first UE obtains the pilot frequency resource information from the data information, according to the pilot frequency resource information, the first UE learns that the number of space transmission layers allocated to itself is 1, that the pilot frequency resource for transmission at the first space multiplexing transmission layer is p1, and therefore learns that its own pilot frequency resource is p1. Further, since the pilot frequency resources currently used by the communication system are p1, p2, and p3, it can be learned that the data transmission resource unit is an RE other than the first RE 201, second RE 202, and third RE 203 as shown in FIG. 3. Therefore, the first UE can correctly obtain from the data transmission resource unit the service data sent by the eNodeB. The first UE learns that its own pilot frequency resource is p1, and infers that the pilot frequency resources used by the second UE may be p2 and p3. In this way, the first UE can estimate the channel estimation value of the second UE by detecting pilot frequency resources p2 and p3, and perform signal detection or interface suppression detection according to the channel estimation value of the second UE.

Similarly, after the second UE obtains pilot frequency resource information from the data information, according to the pilot frequency resource information, the second UE learns that the number of space transmission layers allocated to itself is 2, that the pilot frequency resource for transmission at the first space multiplexing transmission layer is p2, and therefore learns that its own pilot frequency resources are p2 and p3. Further, since the pilot frequency resources currently used by the communication system are p1, p2, and p3, it can learned that the data transmission resource unit is an RE other than the first RE 201, second RE 202, and third RE 203 as shown in FIG. 3. Therefore, the second UE can correctly obtain from the data transmission resource unit the service data sent by the eNodeB. The second UE learns that its own pilot frequency resources are p2 and p3, and infers that the pilot frequency resource used by the first UE may be p1. In this way, the second UE can estimate the channel estimation value of the first UE by detecting pilot frequency resource p1, and perform signal detection or interface suppression detection according to the channel estimation value of the first UE.

Figure 4:
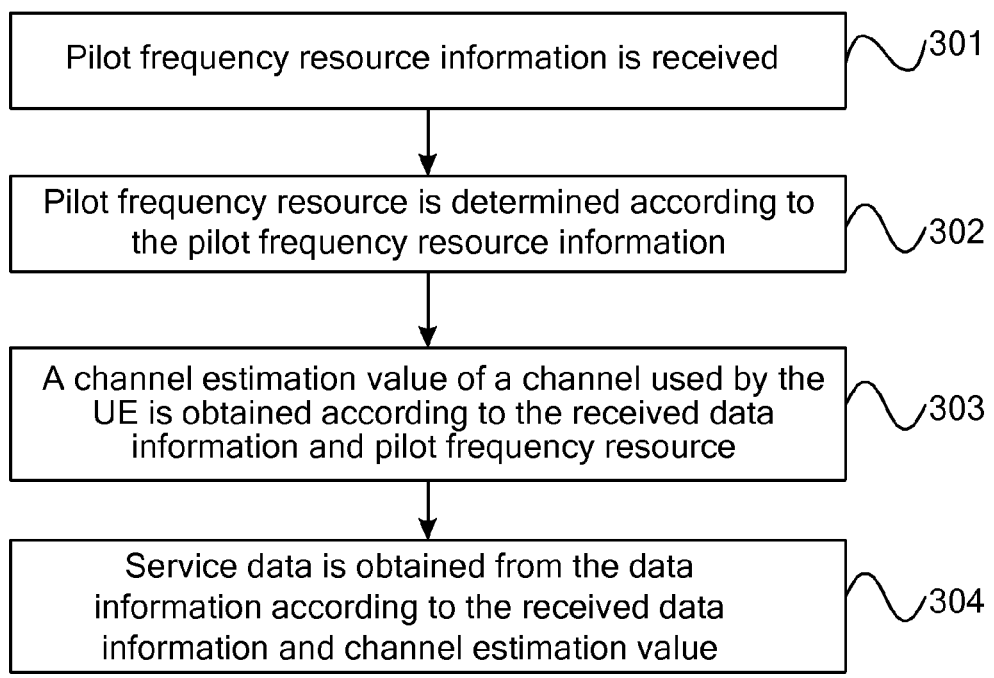
FIG. 4 is a flowchart of a method for handling data receiving provided in an embodiment of the present invention.

FIG. 4 is a flowchart of a method for handling data receiving provided in an embodiment of the present invention. The embodiment can be implemented by a UE. As shown in FIG. 4, the method includes:

Step 301: receiving pilot frequency resource information;

Step 302: determining pilot frequency resource according to the pilot frequency resource information;

Specifically, the pilot frequency resource information in step 301 can include received pilot frequency resource for transmission at a first space transmission layer among space transmission layers and the number of space transmission layers allocated to the UE. Accordingly, in step 302, according to the pilot frequency resource for transmission at the first space transmission layer and the number of space transmission layers, the UE can obtain its own pilot frequency resource. Or, the pilot frequency resource information in step 301 can be the received pilot frequency resource for transmission at each space transmission layer. In this case, in step 302, the pilot frequency resource of the UE can be directly obtained according to the pilot frequency resource information. In addition, the pilot frequency resource information in step 301 can be the received pilot frequency resource for transmission at the first space transmission layer among the space transmission layers. In this way, when the number of space transmission layers is preset for each UE, the UE can obtain its own pilot frequency resource according to the preset number of its own space transmission layers and pilot frequency resource for transmission at the first space transmission layer;

Step 303: obtaining, according to the received data information and pilot frequency resource, a channel estimation value of a channel used by the UE;

Specifically, according to an embodiment of the present invention, in CDM mode, the mapping relationship between the pilot frequency resource and a code can be preset. Accordingly, in step 303, the code corresponding to the determined pilot frequency resource of the UE can be obtained according to the mapping relationship between the pilot frequency resource and the code, thereby obtaining the channel estimation value of the channel used by the UE. In addition, the code of the pilot frequency resource may also be sent by the eNodeB;

As an embodiment of the present invention, the code of the pilot frequency resource may include: c1=[1,1,1,1], c2=[1,-1,1,-1], c3=[1,1,-1,-1], and c4=[1,-1,-1,1]. In this case, the first half section of c1 is [+1 +1], the first half section of c2 is [+1 -1], and they are orthogonal. The second half section of c1 is [+1 +1], the second half section of c2 is [+1 -1], and they are also orthogonal. Apparently, c1 and c2 are orthogonal. That is, c1 and c2 are vectors that are orthogonal by section. Similarly, c3 and c4 are vectors that are orthogonal by section.

According to another embodiment of the present invention, the code of the pilot frequency resource may include: c1=[1,0,1,0], c2=[0,1,0,1], c3=[1,0,-1,0], and c4=[0,1,0,-1]. In this embodiment, c1 and c2 are also vectors that are orthogonal by section. Similarly, c3 and c4 are vectors that are also orthogonal by section. When c1=[1,0,1,0], c2=[0,1,0,1], c3=[1,0,-1,0], and c4=[0,1,0,-1], the symbol represented by 0 in the code indicates that no data exists and that the frequency division multiplexing mode is used. Compared with the CDM mode that is used when c1=[1,1,1,1], c2=[1,-1,1,-1], c3=[1,1,-1,-1], and c4=[1,-1,-1,1], the channel estimation performance is improved;

In addition, according to other embodiments of the present invention, the code of the pilot frequency resource can select other 4×4 orthogonal matrix that has the section-by-section orthogonal feature. According to related regulations of the 3GPP, by using 4×4 orthogonal matrix that has the section-by-section orthogonal feature can improve the channel estimation performance.

Step 304: obtaining service data from the data information according to the received data information and channel estimation value.

In addition, as another embodiment of the method for handling data receiving provided in the present invention, on the basis of the embodiment as shown in FIG. 4, the pilot frequency resource information received at step 301 further includes the current usage status of the pilot frequency resource in the communication system. Accordingly, the UE can estimate the channel estimation value of another UE except itself among the matching UEs according to the current usage status of pilot frequency resources, and perform signal detection or interference suppression detection according to the channel estimation value of another UE.

Figure 5:
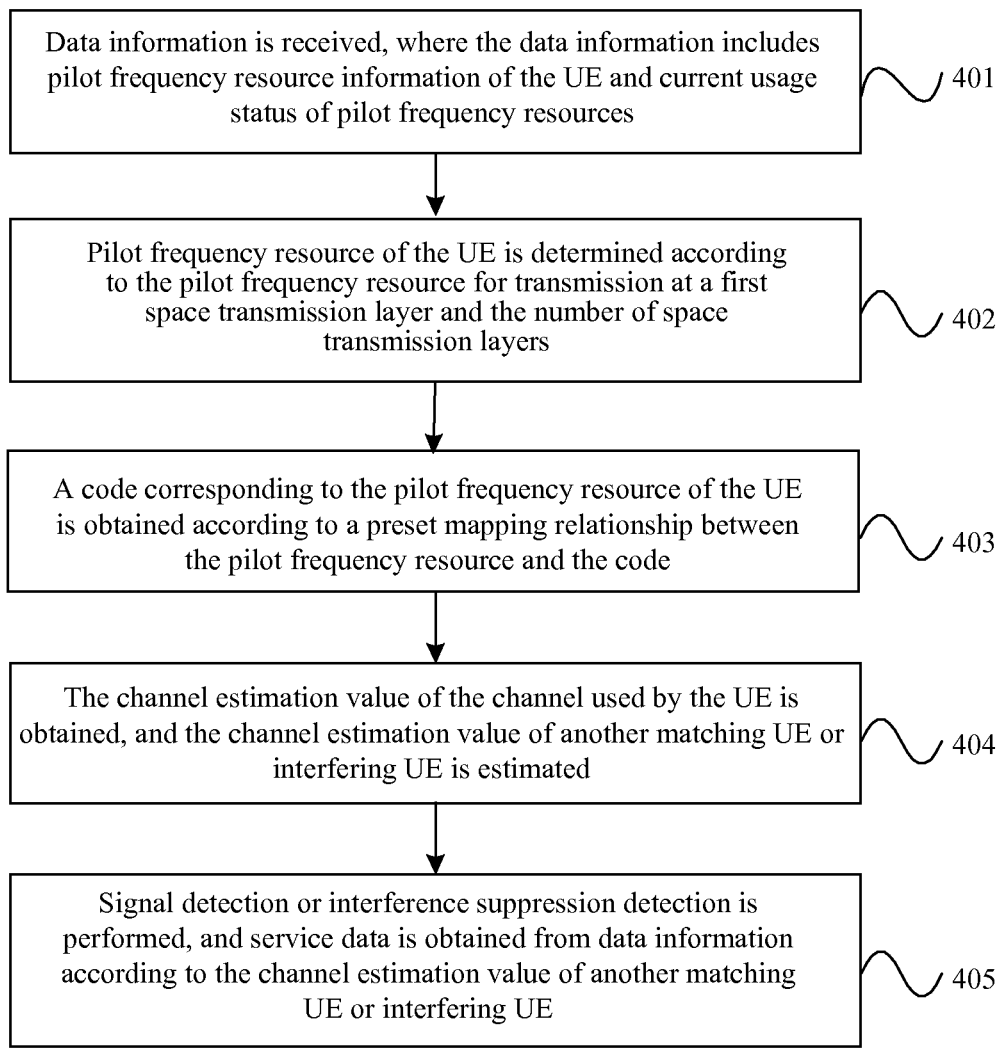
FIG. 5 is a flowchart of a method for handling data receiving provided in another embodiment of the present invention.

FIG. 5 is a flowchart of a method for handling data receiving provided in another embodiment of the present invention. The procedures of the embodiment may be implemented by a first UE. As shown in FIG. 5, the embodiment includes the following steps:

Step 401: receiving, by a UE, data information, where the data information includes pilot frequency resource information of the UE and current usage status of pilot frequency resources in a communication system, and the pilot frequency resource information of the UE includes pilot frequency resource for transmission at a first space transmission layer among space transmission layers and the number of space transmission layers allocated to the UE.

Step 402: determining, by the UE, pilot frequency resource of the UE according to the pilot frequency resource for transmission at the first space transmission layer and the number of space transmission layers.

Step 403: obtaining, by the UE, a code corresponding to the pilot frequency resource of the UE according to a preset mapping relationship between the pilot frequency resource and the code.

Step 404: obtaining, by the UE, a channel estimation value of a channel used by the UE, according to the received data information and obtained code of the pilot frequency resource; and estimating a channel estimation value of another UE or interfering UE except itself among matching UEs according to the current usage status of pilot frequency resources in the communication system.

In the following example, the time frequency resource in the communication system is the time frequency resource block as shown in FIG. 2. The following method can be used to obtain the channel estimation value of the channel used by the UE.

The following takes eight transmit antennas for example. Suppose that the number of space transmission layers is eight, that is, eight layers of signals are transmitted over space. The receive signal on one receive antenna of the UE is as follows:

$$y = HWX + n \quad (1)$$

$$= [h_{11} \; h_{12} \; h_{13} \; h_{14} \; h_{15} \; h_{16} \; h_{17} \; h_{18}]$$

$$\begin{bmatrix} w_{11} & w_{12} & \cdots & w_{18} \\ w_{21} & w_{22} & \cdots & w_{28} \\ \vdots & \vdots & \vdots & \vdots \\ w_{81} & w_{82} & \cdots & w_{88} \end{bmatrix} \begin{bmatrix} x_1 \\ x_2 \\ \vdots \\ x_8 \end{bmatrix} + n$$

$$= [\tilde{h}_1 \; \tilde{h}_2 \; \cdots \; \tilde{h}_8] \begin{bmatrix} x_1 \\ x_2 \\ \vdots \\ x_8 \end{bmatrix} + n$$

Where, $\tilde{h}_1$ to $\tilde{h}_8$ are synthesized channel coefficients, $w_{ij}$ is the weight coefficient on transmit antenna i (i=1, ..., 8) transmitted by space transmission layer j, and $x_j$ (j=1~8) is the transmission symbol at space transmission layer j. From the preceding formula (1), it can be seen that the UE only needs to estimate the synthesized channel coefficient $\tilde{h}_j$ (j=1, ..., 8) for data detection.

For the transmission of pilot frequency resource at the first space transmission layer, at the transmit end, it may be the eNodeB that performs the following processing:

$$\begin{bmatrix} w_{11} \\ w_{21} \\ \vdots \\ w_{81} \end{bmatrix} [c_{11} \; c_{12} \; c_{13} \; c_{14}]s = \quad (2)$$

$$\begin{bmatrix} \begin{bmatrix} w_{11} \\ w_{21} \\ \vdots \\ w_{81} \end{bmatrix} c_{11}s, & \begin{bmatrix} w_{11} \\ w_{21} \\ \vdots \\ w_{81} \end{bmatrix} c_{12}s, & \begin{bmatrix} w_{11} \\ w_{21} \\ \vdots \\ w_{81} \end{bmatrix} c_{13}s, & \begin{bmatrix} w_{11} \\ w_{21} \\ \vdots \\ w_{81} \end{bmatrix} c_{14}s \end{bmatrix}$$

Where, s indicates the pilot frequency symbol transmitted on the pilot frequency resource, and $c_{ij}$ indicates symbol j (j=1, ..., 4) of the code $c_i$ (i=1, ..., 4). In the right side of equation (2), a first column is on the first RE 201 of a sixth OFDM symbol in timeslot 0, and is transmitted over eight transmit antennas respectively. A second column is on the first RE 201 of a seventh OFDM symbol in timeslot 0, and is transmitted over eight transmit antennas respectively. A third column is on the first RE 201 of a sixth OFDM symbol in timeslot 1, and is transmitted over eight transmit antennas respectively. A fourth column is on the first RE 201 of a seventh OFDM symbol in timeslot 1, and is transmitted over eight transmit antennas respectively. Accordingly, for the pilot frequency resources at space transmission layers 1 to 4, codes $c_1$ to $c_4$ are used respectively. Similarly, the pilot frequency resources at space transmission layers 5 to 8 may be transmitted on the second RE 202 by using the same method.

For a receive antenna, the corresponding receive signal in the four first RE 201 areas is as follows:

$$y = [y_1 \; y_2 \; y_3 \; y_4] \quad (3)$$
$$= [h_{11} \; h_{12} \; \ldots \; h_{18}]$$
$$\left( \begin{bmatrix} w_{11} \\ w_{21} \\ \vdots \\ w_{81} \end{bmatrix} [c_{11} \; c_{12} \; c_{13} \; c_{14}]s + \ldots + \begin{bmatrix} w_{14} \\ w_{24} \\ \vdots \\ w_{84} \end{bmatrix} [c_{41} \; c_{42} \; c_{43} \; c_{44}]s \right) + n,$$
$$= c_1 \tilde{h}_1 s + c_2 \tilde{h}_2 s + c_3 \tilde{h}_3 s + c_4 \tilde{h}_4 s + n$$

Where, n indicates the noise, and $\tilde{h}_1$ to $\tilde{h}_4$ indicate respectively coefficients of four synthesized channels, that is:

$$\tilde{h}_i = [h_{11} \; h_{12} \; \ldots \; h_{18}] \begin{bmatrix} w_{1i} \\ w_{2i} \\ \vdots \\ w_{8i} \end{bmatrix}, \quad (4)$$
$$i = 1 \ldots 4$$

Further, the following formula (5) can be used to obtain the channel estimation value of $\tilde{h}_1$:

$$\hat{h}_1 = \frac{1}{4}(c_1)^H y \quad (5)$$

Similarly, the channel estimation values of $\tilde{h}_2$ to $\tilde{h}_4$ can be obtained. Similar channel estimation methods can be used to obtain the channel estimation values of $\tilde{h}_5$ to $\tilde{h}_8$ for the 12 second RE 202s in FIG. 2.

Step 405: obtaining, by the UE, service data from the data information according to the received data information and channel estimation value through the formula $\hat{S} = G^H Y$.

Where, $\hat{S}$ indicates the service data obtained after UE performs detection, and G indicates the processing vector of the UE $$\left( G = \left( H_1 H_1^H + \sum_i H_i H_i^H + \alpha I_N \right)^{-1} H_1 \right).$$

$H_1$ indicates the channel estimation value of this UE, $H_i$ indicates the channel estimation value of another matching UE or interfering UE among matching UEs except the UE itself, $I_N$ indicates the N-dimension unit matrix, and α indicates the signal/noise ratio (SNR) factor ($\alpha = P_n/P$). $P_n$ indicates the noise power, and P indicates the transmit signal power at each space transmission layer before the UE pre-processes the data information. If the transmit signal power at each space transmission layer before the UE pre-processes the data information is 1, then $\alpha = P_n$.

Figure 6:
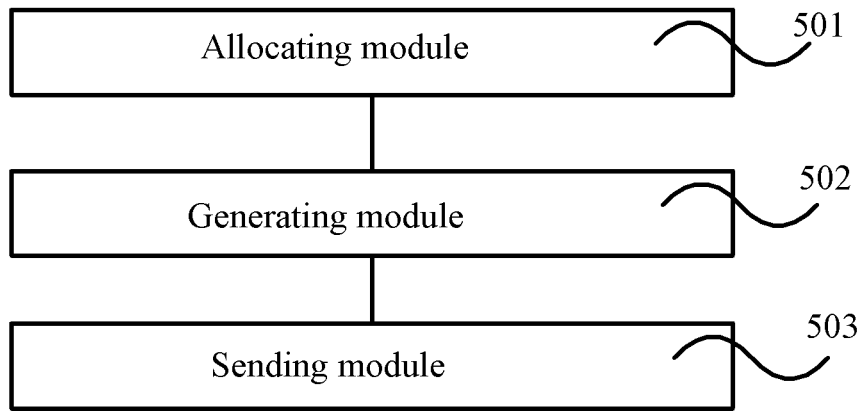
FIG. 6 is a structure diagram of an apparatus for handling data sending provided in an embodiment of the present invention.

FIG. 6 is a structure diagram of an apparatus for handling data sending provided in an embodiment of the present invention. The apparatus for handling data sending can serve as an eNodeB, or be set in an eNodeB to implement the procedures of the embodiment as shown in FIG. 1. As shown in FIG. 6, the apparatus for handling data sending provided in this embodiment includes an allocating module 501, a generating module 502, and a sending module 503. The allocating module 501 is configured to allocate the number of space transmission layers and pilot frequency resource for transmission at each transmission layer allocated to the UE. The generating module 502 is configured to generate pilot frequency resource information according to the number of space transmission layers and the pilot frequency resource for transmission at each transmission layer allocated by the allocating module 501. Specifically, the pilot frequency resource information may include: pilot frequency resource for transmission at a first space transmission layer among space transmission layers and the number of space transmission layers allocated to the UE, or pilot frequency resource for transmission at each space transmission layer allocated to the UE, or pilot frequency resource for transmission at the first space transmission layer among the space transmission layers allocated to the UE. In addition, the pilot frequency resource information may further include: current usage status of pilot frequency resources in the communication system and/or usage status of pilot frequency resource for transmission at each space transmission layer allocated to the UE, for example, in CDM mode, the code of the pilot frequency resource for transmission at each space transmission layer allocated to the UE. The sending module 503 is configured to send to the UE the pilot frequency resource information generated by the generating module 502.

Figure 7:
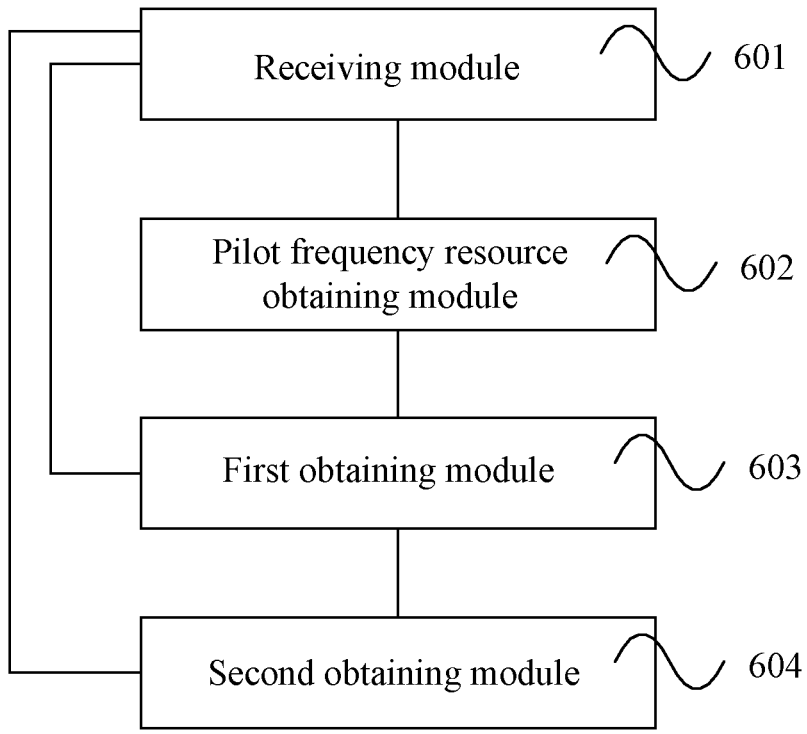
FIG. 7 is a structure diagram of an apparatus for handling data receiving provided in an embodiment of the present invention.

FIG. 7 is a structure diagram of an apparatus for handling data receiving provided in an embodiment of the present invention. The apparatus for handling data sending can serve as a UE, or be set in a UE to implement the procedures of the embodiment as shown in FIG. 4 or FIG. 5. As shown in FIG. 7, the apparatus for handling data sending provided in this embodiment includes a receiving module 601, a pilot frequency resource obtaining module 602, a first obtaining module 603, and a second obtaining module 604. The receiving module 601 is configured to receive data information and pilot frequency resource information. The pilot frequency obtaining module 602 is configured to determine pilot frequency resource of the UE according to the pilot frequency resource information received by the receiving module 601. The first obtaining module 603 is configured to obtain a channel estimation value of a channel used by the UE, according to the data information received by the receiving module 601 and the pilot frequency resource obtained by the obtaining module 602. In an embodiment of the present invention, the first obtaining module 603 may obtain, according to a preset mapping relationship between pilot frequency resource and a code, a code corresponding to the pilot frequency resource of the UE determined by the pilot frequency resource obtaining module 602. Or, the pilot frequency resource information carries the code of the pilot frequency resource, and the first obtaining module 603 obtains the code of the pilot frequency resource from the pilot frequency resource information, and further obtains the channel estimation value of the channel used by the UE, according to the data information received by the receiving module 601 and the code of the pilot frequency resource. The second obtaining module 604 is configured to perform data detection and obtain service data according to the data information received by the receiving module 601 and the channel estimation value obtained by the first obtaining module 603.

Specifically, as an embodiment of the present invention, the second obtaining module 604 obtains service data according to the formula $\hat{S}=G^H Y$. $\hat{S}$ indicates the service data obtained after UE performs detection, and G indicates the processing vector of the UE $$G = \left(H_1 H_1^H + \sum_i H_i H_i^H + \alpha I_N\right)^{-1} H_1.$$

$H_1$ indicates the channel estimation value of the UE, $H_i$ indicates the channel estimation value of another matching UE or interfering UE among matching UEs except the UE itself, $I_N$ indicates the N-dimension unit matrix, and $\alpha$ indicates the signal/noise ratio (SNR) factor ($\alpha=P_n/P$). $P_n$ indicates the noise power, and P indicates the transmit signal power at each space transmission layer before the UE pre-processes the data information. If the transmit signal power at each space transmission layer before the UE pre-processes the data information is 1, then $\alpha=P_n$.

According to an embodiment of the present invention, the pilot frequency resource information may be specifically: the pilot frequency resource for transmission at a first space transmission layer among space transmission layers and the number of space transmission layers received by the receiving module 601, or the pilot frequency resource for transmission at each space transmission layer received by the receiving module 601. In addition, the pilot frequency resource information may also be the pilot frequency resource for transmission at the first space transmission layer among the space transmission layers received by the receiving module 601. Accordingly, the pilot frequency resource obtaining module 602 determines the pilot frequency resource of the UE according to the preset number of space transmission layers and the pilot frequency resource for transmission at the first space transmission layer.

Figure 8:
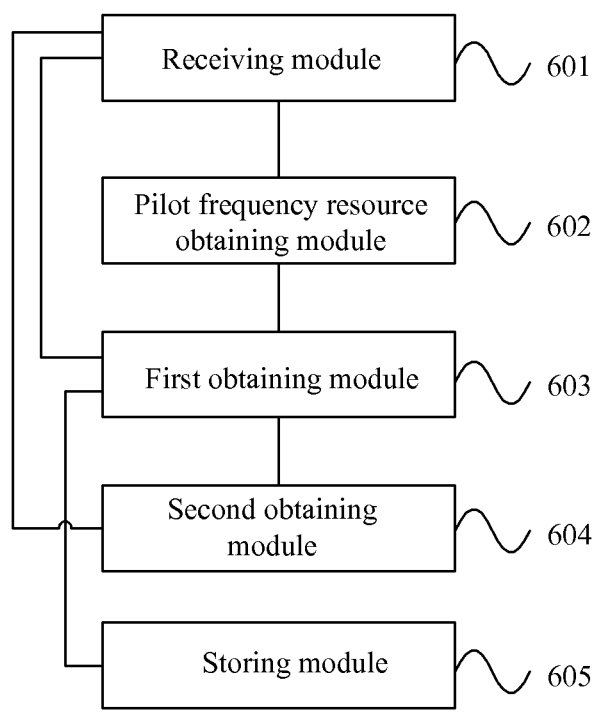
FIG. 8 is a structure diagram of an apparatus for handling data receiving provided in another embodiment of the present invention.

FIG. 8 is a structure diagram of an apparatus for handling data receiving provided in another embodiment of the present invention. The apparatus for handling data sending can serve as a UE, or be set in a UE to implement the procedures of the embodiment as shown in FIG. 4 or FIG. 5. Compared with the embodiment as shown in FIG. 7, the apparatus for handling data receiving in this embodiment includes a storing module 605 configured to store a preset mapping relationship between pilot frequency resource and a code. Accordingly, the first obtaining module 603 obtains, according to the mapping relationship between the pilot frequency resource and the code stored in the storing module 605, the code of the pilot frequency resource determined by the pilot frequency resource obtaining module 602. Or, the receiving module 601 is configured to receive the code that is of the pilot frequency resource and is sent by the eNodeB. The code may be included in the pilot frequency resource information. Accordingly, the first obtaining module 603 obtains, according to the data information received by the receiving module 601 and the code that is of the pilot frequency resource and is sent by the eNodeB, the channel estimation value of the channel used by the UE.

Figure 9:
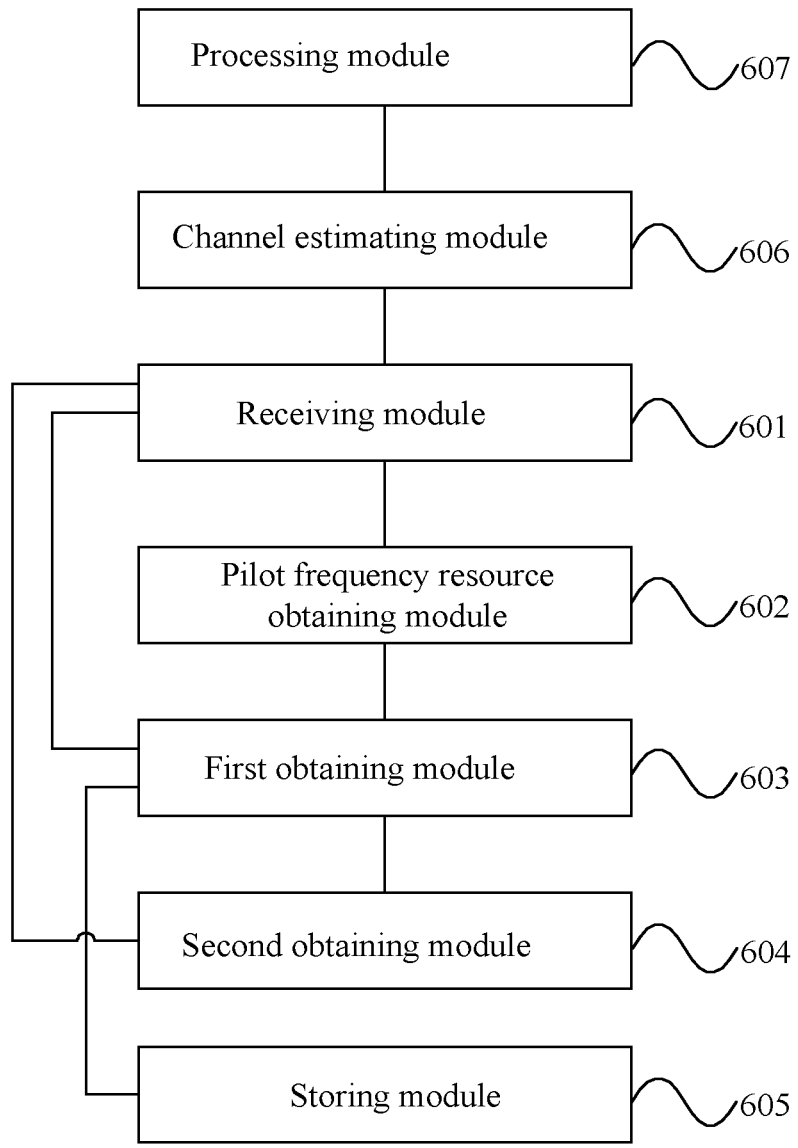
FIG. 9 is a structure diagram of an apparatus for handling data receiving provided in yet another embodiment of the present invention.

FIG. 9 is a structure diagram of an apparatus for handling data receiving provided in another embodiment of the present invention. The apparatus for handling data sending can serve as a UE, or be set in a UE to implement the procedures of the embodiment as shown in FIG. 4 or FIG. 5. Compared with the embodiment as shown in FIG. 7 or FIG. 8, in the apparatus for handling data receiving in this embodiment, the data information received by the receiving module 601 further includes the current usage status of pilot frequency resources in the communication system. Accordingly, the apparatus for handling data receiving further includes a channel estimating module 606 and a processing module 607. The channel estimating module 606 is configured to estimate the channel estimation value of another matching UE or interfering UE among the matching UEs except the UE itself according to the current usage status of pilot frequency resources in the communication system received by the receiving module 601. The processing module 607 is configured to perform signal detection or interference suppression detection according to the channel estimation value of another matching UE or interfering UE among the matching UEs except the UE itself estimated by the channel estimating module 606.

A communication system is provided in an embodiment of the present invention. The communication system includes an eNodeB and a UE. The eNodeB is configured to allocate the number of space transmission layers and pilot frequency resource for transmission at each space transmission layer, generate pilot frequency resource information according to the number of space transmission layers and the pilot frequency resource for transmission at each space transmission layer, and send the pilot frequency resource information to the UE. Specifically, the eNodeB can be implemented through the apparatus for handling data sending provided in the embodiment as shown in FIG. 6.

The UE is configured to receive the data information and pilot frequency resource information sent by the eNodeB, determine pilot frequency resource according to the pilot frequency resource information, obtain, according to the data information and the pilot frequency resource, the channel estimation value of the channel used by the UE, and obtain service data according to the data information and the channel estimation value. Specifically, the UE can be implemented through the apparatus for handling data receiving provided in the embodiment as shown in FIG. 7, FIG. 8, or FIG. 9.

Figure 10:
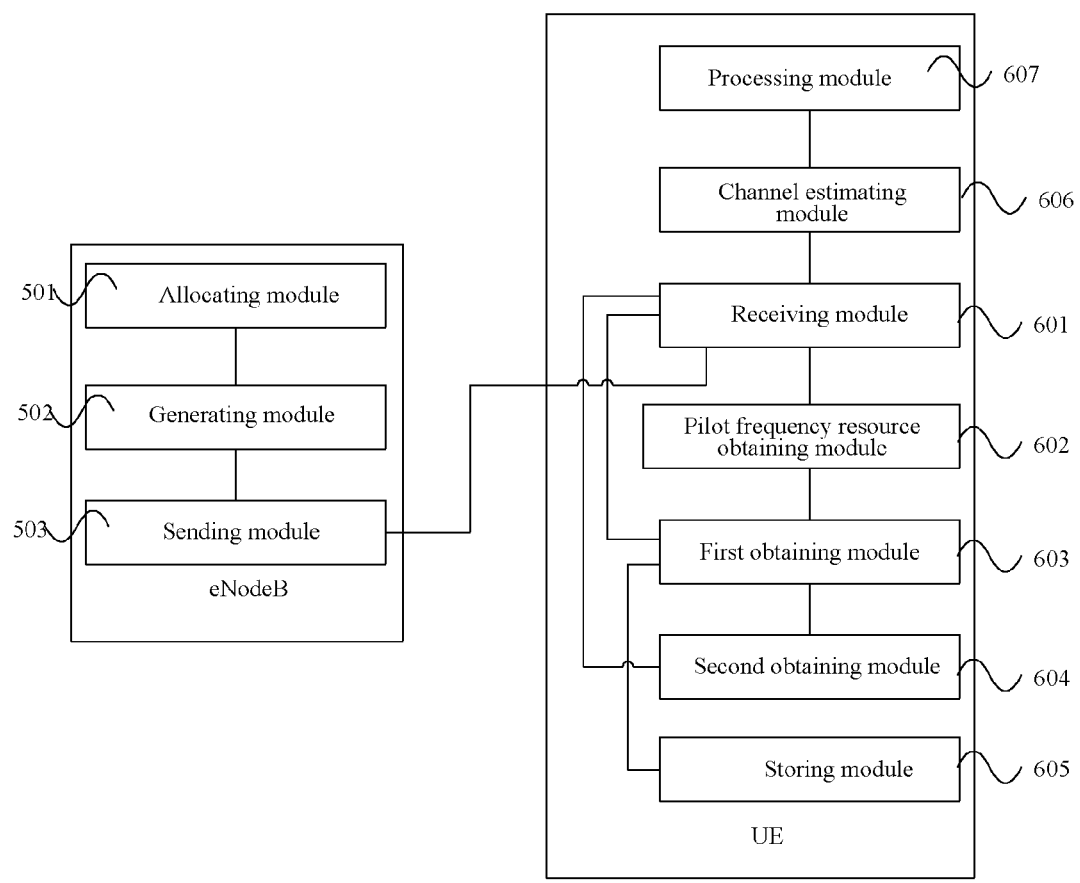
FIG. 10 is a structure diagram of a communication system provided in an embodiment of the present invention.

FIG. 10 is a structure diagram of a communication system provided in an embodiment of the present invention. In this embodiment, the eNodeB uses the apparatus for handling data sending provided in the embodiment as shown in FIG. 6, and the UE uses the apparatus for handling data receiving provided in the embodiment as shown in FIG. 9. When the UE uses the apparatus for handling data receiving provided in the embodiment as shown in FIG. 7 or FIG. 8, the connection relationship between corresponding modules in the UE and eNodeB is the same as that in FIG. 10.

It can be understood by those skilled in the art that all or part of steps in the preceding method embodiments can be performed by a program instructing related hardware. The program can be stored in a storage medium that can be read by a computer. When the program runs, the program executes the steps in the preceding method embodiments of the present invention. The storage medium can be ROM, RAM, disk, or CD that can store program codes.

In the embodiment of the present invention, pilot frequency resource information is generated according to the number of space transmission layers and pilot frequency resource for transmission at each space transmission layer allocated to the UE, and is sent to the UE. Then, according to the pilot frequency resource information, the UE can determine the specifically used pilot frequency resource to effectively distinguish the specific user channels, obtain correct channel estimation values, improve the channel estimation performance, and obtain correct service data.

It should be noted that the preceding embodiments are merely used to describe the technical solutions of the present invention but not to limit the present invention. Those skilled in the art should understand that modifications or equivalent replacements can be made on the technical solutions of the present invention without departing from the spirit and scope of the technical solutions of the present invention.

What is claimed is:

1. A method of handling data sending, comprising:
generating pilot frequency resource information specific to each user equipment (UE) in a multiple user multiple input multiple output (MU-MIMO) mode according to a number of space transmission layers and a pilot frequency resource for transmission at each space transmission layer allocated to each UE in the MU-MIMO mode; and
sending the pilot frequency resource information to each UE in the MU-MIMO mode.

2. The method according to claim 1, wherein the pilot frequency resource information specific to each UE in the MU-MIMO mode comprises at least one of the followings:
pilot frequency resource for transmission at a first space transmission layer among the allocated space transmission layers, and the number of space transmission layers;
pilot frequency resource for transmission at each allocated space transmission layer; and
pilot frequency resource for transmission at the first space transmission layer among the allocated space transmission layers.

3. The method according to claim 1, wherein, the pilot frequency resource information specific to each UE in the MU-MIMO mode further comprises at least one of the followings:
current usage status of pilot frequency resources in a communication system and usage status of allocated pilot frequency resources for transmission at space transmission layers.

4. The method according to claim 3, wherein the usage status of allocated pilot frequency resources for transmission at space transmission layers is a code of allocated pilot frequency resource for transmission at each space transmission layer;
the code comprises: c1=[1,1,1,1], c2=[1,−1,1,−1], c3=[1,1,−1,−1], and c4=[1,−1,−1,1]; or
c1=[1,0,1,0], c2=[0,1,0,1], c3=[1,0,−1,0], and c4=[0,1,0,−1].

5. A method of handling data receiving, comprising:
receiving, by a user equipment (UE) in a multiple user multiple input multiple output (MU-MIMO) mode, pilot frequency resource information, wherein the pilot frequency resource information being specific to the UE and generated according to a number of space transmission layers and pilot frequency resource for transmission at each space transmission layer allocated to the UE;
determining pilot frequency resource allocated to the UE according to the pilot frequency resource information specific to the UE;
obtaining, according to received data information and pilot frequency resource, a channel estimation value of a channel used by the UE; and
obtaining service data according to the data information and the channel estimation value.

6. The method according to claim 5, wherein, obtaining the service data according to the data information and channel estimation value comprises:
obtaining service data according to $\hat{S}=G^H Y$,
wherein, $\hat{S}$ indicates the service data obtained after UE performs detection, and Y indicates a received signal, and G indicates the processing vector of the UE $$\left(G = \left(H_1 H_1^H + \sum_i H_i H_i^H + \alpha I_N\right)^{-1} H_1\right);$$

$H_1$ indicates the channel estimation value of the UE, $H_i$ indicates the channel estimation value of another matching UE or interfering UE among matching UEs except the UE itself, $I_N$ indicates the N-dimension unit matrix, and $\alpha$ indicates the signal/noise ratio (SNR) factor ($\alpha=P_n/P$); $P_n$ indicates the noise power, and P indicates the transmit signal power at each space transmission layer before the UE pre-processes the data information.

7. The method according to claim 5, wherein, the pilot frequency resource information specific to the UE comprises:
received pilot frequency resource for transmission at a first space transmission layer among the space transmission layers, and the number of the space transmission layers; or,
received pilot frequency resource for transmission at each space transmission layer.

8. The method according to claim 5, wherein, the pilot frequency resource information specific to the UE comprises:
received pilot frequency resource for transmission at a first space transmission layer among the space transmission layers; and
determining the pilot frequency resource allocated to the UE according to the pilot frequency resource information specific to the UE by determining the pilot frequency resource of the UE according to a preset number of space transmission layers and pilot frequency resource for transmission at a first space transmission layer.

9. The method according to claim 5, further comprising:
presetting a mapping relationship between pilot frequency resource and a code
obtaining the code of the pilot frequency source according to the mapping relationship; or receiving the code that is of the pilot frequency resource from an eNodeB; and
wherein obtaining the channel estimation value of the channel used by the UE includes obtaining, according to the data information and the code of the pilot frequency resource, the channel estimation value of the channel used by the UE.

10. The method according to claim 9, wherein, the code of the pilot frequency resource comprises: c1=[1,1,1,1], c2=[1,−1,1,−1], c3=[1,1,−1,−1], and c4=[1,−1,−1,1];
Or
c2=[0,1,0,1], c3=[1,0,−1,0], and c4=[0,1,0,−1].

11. The method according to claim 5, wherein, the pilot frequency resource information specific to the UE further comprises current usage status of pilot frequency resources in a communication system; and the method further comprises: estimating the channel estimation value of another matching UE or interfering UE among matching UEs except the UE itself according to the current usage status of pilot frequency resources; and performing signal detection or interference suppression detection according to the channel estimation value of another UE.

12. An apparatus of handling data sending, comprising:
a generating module, configured to generate pilot frequency resource information specific to each user equipment (UE) in a multiple user multiple input multiple output (MU-MIMO) mode according to a number of space transmission layers and pilot frequency resource for transmission at each space transmission layer allocated to each UE in the MU-MIMO mode; and
a sending module, configured to send the pilot frequency resource information to each UE in the MU-MIMO mode.

13. The apparatus according to claim 12, wherein, the pilot frequency resource information specific to each UE in the MU-MIMO mode comprises:
pilot frequency resource for transmission at a first space transmission layer among the allocated space transmission layers, and the number of space transmission layers; or
pilot frequency resource for transmission at each allocated space transmission layer; or
pilot frequency resource for transmission at the first space transmission layer among the allocated space transmission layers.

14. The apparatus according to claim 12, wherein, the pilot frequency resource information specific to each UE in the MU-MIMO mode further comprises at least one of current usage status of pilot frequency resources and usage status of allocated pilot frequency resources for transmission at space transmission layers.

15. An apparatus of handling data receiving in a multiple user multiple input multiple output (MU-MIMO) mode, comprising:
a receiving module, configured to receive data information and pilot frequency resource information, wherein the pilot frequency resource information being specific to a user equipment (UE) and generated according to a number of space transmission layers and pilot frequency resource for transmission at each space transmission layer;
a pilot frequency resource obtaining module, configured to determine pilot frequency resource according to the pilot frequency resource information;
a first obtaining module, configured to obtain a channel estimation value of a channel used by a UE, according to the data information and pilot frequency resource; and
a second obtaining module, configured to obtain service data according to the data information and the channel estimation value.

16. The apparatus according to claim 15, wherein, the second obtaining module obtains the service data according to $\hat{S}=G^H Y$,
wherein, $\hat{S}$ indicates the service data obtained after UE performs detection, and Y indicates a transmitted signal, and G indicates the processing vector of the UE $$\left(G = \left(H_1 H_1^H + \sum_i H_i H_i^H + \alpha I_N\right)^{-1} H_1\right);$$

$H_1$ indicates the channel estimation value of the UE, $H_i$ indicates the channel estimation value of another matching UE or interfering UE among matching UEs except the UE itself, $I_N$ indicates the N-dimension unit matrix, and $\alpha$ indicates the signal/noise ratio (SNR) factor ($\alpha=P_n/P$); $P_n$ indicates the noise power, and P indicates the transmit signal power at each space transmission layer before the UE pre-processes the data information.

17. The apparatus according to claim 15, wherein, the pilot frequency resource information specific to the UE comprises:
pilot frequency resource for transmission at a first space transmission layer among the space transmission layers received by the receiving module, and the number of the space transmission layers; or, pilot frequency resource for transmission at each space transmission layer received by the receiving module.

18. The apparatus according to claim 15, wherein, the pilot frequency resource information specific to the UE comprises:
pilot frequency resource for transmission at a first space transmission layer among the space transmission layers received by the receiving module; and
the pilot frequency resource obtaining module determines the pilot frequency resource according to a preset number of space transmission layers and the pilot frequency resource for transmission at the first space transmission layer.

19. The apparatus according to claim 15, further comprising:
a storing module, configured to store a preset mapping relationship between pilot frequency resource and a code;
the first obtaining module, configured to obtain the code of the pilot frequency resource according to the mapping relationship, and further obtain, according to the data information and the code of the pilot frequency resource, the channel estimation value of the channel used by the UE; or
the receiving module, further configured to receive the code that is of the pilot frequency resource from an eNodeB; and
the first obtaining module, configured to obtain the channel estimation value of the channel used by the UE, according to the data information and the code that is of the pilot frequency resource and is sent by the eNodeB.

20. The apparatus according to claim 15, wherein, the pilot frequency resource information further comprises current usage status of pilot frequency resources in the communication system; and
the apparatus further comprises:
a channel estimating module, configured to estimate the channel estimation value of another matching UE or interfering UE among the matching UEs except the UE itself according to the current usage status of pilot frequency resources in the communication system; and
a processing module, configured to perform signal detection or interference suppression detection according to the channel estimation value of another matching UE or interfering UE among the matching UEs except the UE itself.

* * * * *

UNITED STATES PATENT AND TRADEMARK OFFICE
CERTIFICATE OF CORRECTION

PATENT NO. : 8,902,809 B2
APPLICATION NO. : 13/283771
DATED : December 2, 2014
INVENTOR(S) : Sun et al.

Page 1 of 1

It is certified that error appears in the above-identified patent and that said Letters Patent is hereby corrected as shown below:

In the Claims

Claim 10, Column 16, Line 67:

Before "$c_2=[0,1,0,1]$", insert --$c_1=[1,0,1,0]$--, therefor

Signed and Sealed this
Twenty-third Day of June, 2015

Michelle K. Lee
*Director of the United States Patent and Trademark Office*